(12) United States Patent
Strazzanti

(10) Patent No.: US 6,913,375 B2
(45) Date of Patent: *Jul. 5, 2005

(54) LAMP MASKING METHOD AND APPARATUS

(75) Inventor: Michael Strazzanti, Gates Mills, OH (US)

(73) Assignee: Illume, L.L.C., Gates Mills, OH (US)

(*) Notice: Subject to any disclaimer, the term of this patent is extended or adjusted under 35 U.S.C. 154(b) by 69 days.

This patent is subject to a terminal disclaimer.

(21) Appl. No.: 10/419,519

(22) Filed: Apr. 21, 2003

(65) Prior Publication Data

US 2003/0185011 A1 Oct. 2, 2003

Related U.S. Application Data

(63) Continuation-in-part of application No. 10/108,827, filed on Mar. 27, 2002, now Pat. No. 6,550,943, which is a continuation-in-part of application No. 09/967,437, filed on Sep. 28, 2001, now Pat. No. 6,558,026, which is a continuation-in-part of application No. 09/865,402, filed on May 25, 2001, now Pat. No. 6,491,416.

(51) Int. Cl.$^7$ .............................................. F21V 17/02
(52) U.S. Cl. ........................ 362/513; 362/318; 362/464
(58) Field of Search ................................ 362/318, 319, 362/513, 464, 465, 466, 267; 315/82–83; 427/106–107

(56) References Cited

U.S. PATENT DOCUMENTS

| | | | |
|---|---|---|---|
| 2,628,927 A | 2/1953 | Colbert et al. ............... | 428/336 |
| 2,740,732 A | 4/1956 | Peck et al. ................... | 428/458 |
| 3,001,901 A | 9/1961 | Barkley ....................... | 156/222 |
| 3,020,376 A | 2/1962 | Hofmann et al. ............ | 219/536 |
| 3,512,876 A | 5/1970 | Marks .......................... | 359/296 |
| 3,708,219 A | 1/1973 | Forlini et al. ................ | 359/253 |
| 4,142,229 A | 2/1979 | Hulbert, Jr. .................. | 362/292 |
| 4,209,825 A | 6/1980 | Shackelford ................. | 362/299 |
| 4,727,458 A | 2/1988 | Droste et al. ................ | 362/539 |
| 4,814,960 A | 3/1989 | Liu .............................. | 362/307 |
| 4,839,779 A | 6/1989 | Kasboske .................... | 362/214 |
| 4,868,726 A | 9/1989 | Segoshi ....................... | 362/308 |
| 4,985,816 A | 1/1991 | Seko et al. ................... | 362/303 |
| 5,023,758 A | 6/1991 | Allen et al. .................. | 362/514 |
| 5,111,105 A | 5/1992 | Yamamoto ................... | 313/112 |
| 5,438,486 A | 8/1995 | McNair ....................... | 362/512 |
| 5,463,491 A | 10/1995 | Check, III ................... | 359/296 |
| 5,467,217 A | 11/1995 | Check, III et al. ........... | 359/296 |
| 5,517,389 A | 5/1996 | Myers .......................... | 362/518 |
| 5,660,462 A | 8/1997 | Bockley et al. .............. | 362/256 |
| 5,728,251 A | 3/1998 | Check, III ................ | 156/307.5 |
| 5,829,870 A | 11/1998 | Remillard et al. ........... | 362/510 |
| 5,938,323 A | 8/1999 | McMahan .................... | 362/539 |
| 6,017,138 A | 1/2000 | Reiss et al. .................. | 362/297 |
| 6,114,405 A | 9/2000 | Zhuang et al. ................ | 522/99 |
| 6,126,301 A | 10/2000 | Altunay et al. .............. | 362/359 |
| 6,156,239 A | 12/2000 | Saxe et al. ................... | 252/585 |

OTHER PUBLICATIONS

Fujii et al, "Light–Controllable Spot Luminaires Using a Liquid Crystal Light Shuter and a High–Intensity Discharge Lamp", J. Light & Vis., Env. pp. 13–23, vol. 26, No. 1.

Primary Examiner—Alan Cariaso
Assistant Examiner—Ali Alavi
(74) Attorney, Agent, or Firm—Watts Hoffmann Co., L.P.A.

(57) ABSTRACT

A motor vehicle lamp assembly having a light source for emitting light and a source enclosure having a light transmissive portion for transmitting light from the light source to an illumination zone. The enclosure is affixed with a material which covers a selected region of the light transmissive portion of the enclosure. The material is electrically energized to alter an amount of light transmitted from the light source to the illumination zone. A drive circuit electrically coupled to the material energizes the material to control a light output from the lamp assembly.

20 Claims, 6 Drawing Sheets

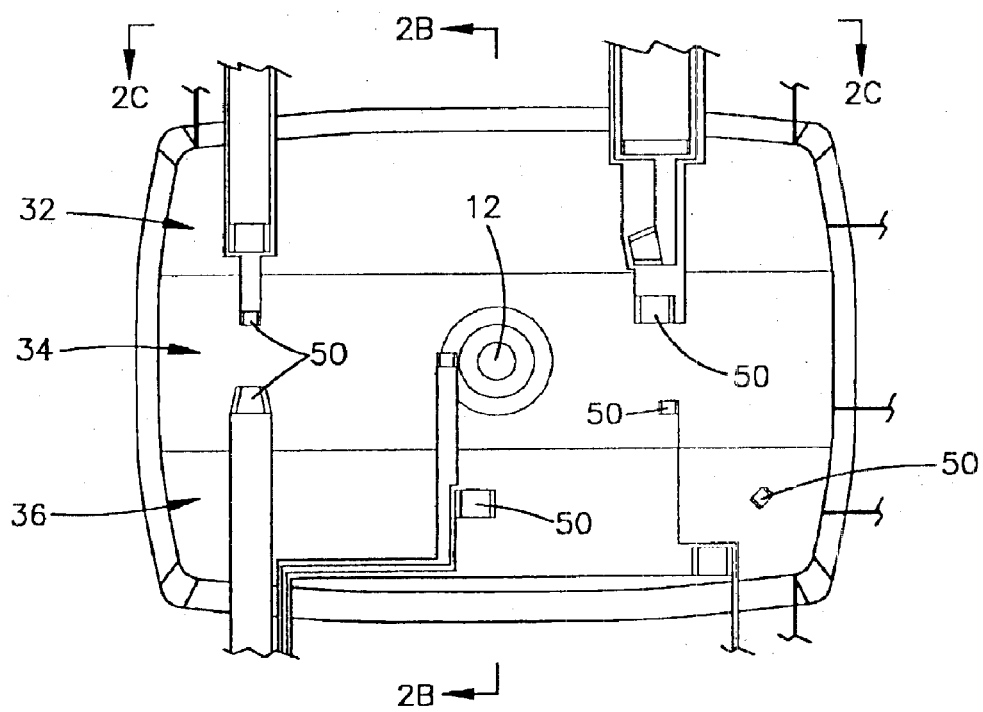
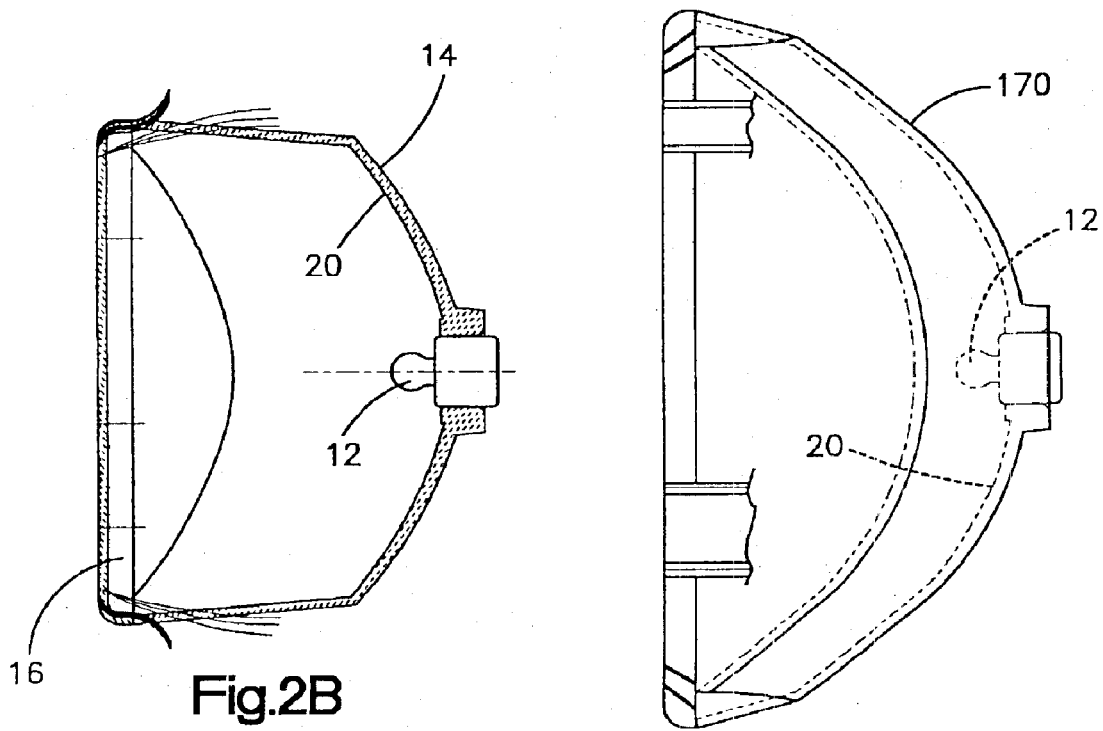
Fig.2A
Fig.2B
Fig.2C

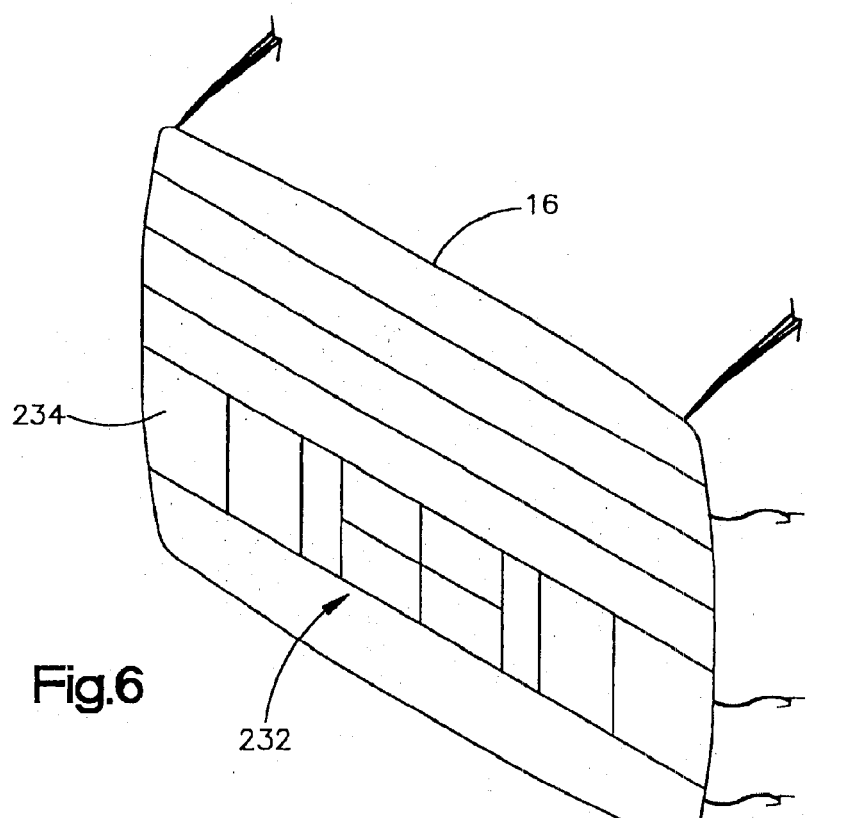
Fig.6
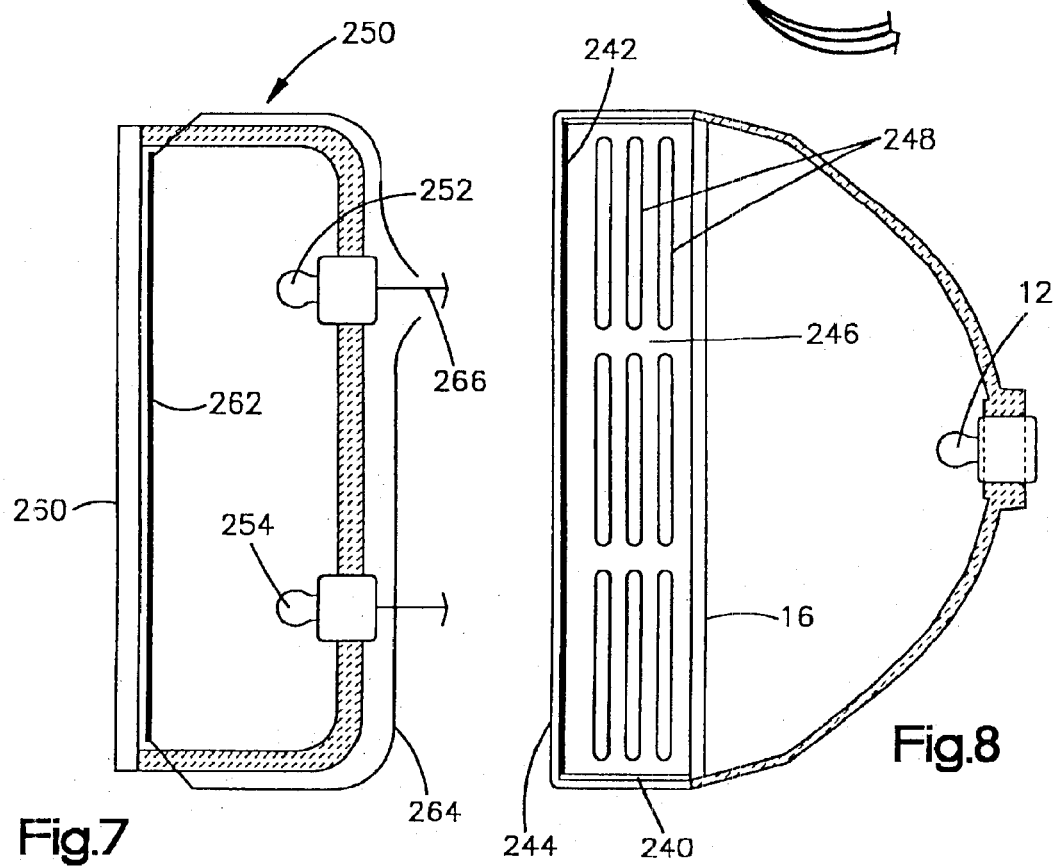
Fig.7
Fig.8

LAMP MASKING METHOD AND APPARATUS

CROSS REFERENCE TO RELATED APPLICATIONS

The present application is a continuation in part containing common subject matter with U.S. patent application Ser. No. 10/108,827, filed Mar. 27, 2002, now U.S. Pat. No. 6,550,943 which is a continuation-in-part of U.S. patent application Ser. No. 09/967,437 which was filed in the United States Patent and Trademark Office on Sep. 28, 2001, now U.S. Pat. No. 6,558,026 which is a continuation in part of U.S. patent application Ser. No. 09/865,402 which was filed in the United States Patent and Trademark Office on May 25, 2001, now U.S. Pat. No. 6,491,416, and which is entitled "Headlamp Masking Method and Apparatus." The subject matter of the co-pending application and issued U.S. Patent are hereby incorporated by reference.

FIELD OF THE INVENTION

The present invention concerns a vehicle lamp having a control for selectively rendering portions of the lamp light transmissive under vehicle operator control.

BACKGROUND ART

All motor vehicles include a control for switching between high beam and low beam operation of the motor vehicle headlamps. This control may be implemented by a floor mounted switch but most typically in more recent designed motor vehicles is implemented with a stalk on the vehicle steering column that is easily actuated by a motor vehicle operator.

When the high beam option is selected, the vehicle headlamps are focused in a direction that illuminates further in advance of the vehicle to improve a motorist's ability to see details in his or her line of sight. When an oncoming vehicle approaches, the motorist can switch to low beam operation to avoid temporarily blinding the oncoming driver. Fog lamps are occasionally installed on vehicles to direct a lamp output downward in a direction closer to the vehicle to enable the motorist to more clearly see during rain and foggy conditions.

Vehicle head lamps most typically contain two separate light bulbs that can be independently activated. When one of the bulbs is activated, a low beam lamp output is produced and when a second bulb of the two bulbs is activated a high beam lamp output is provided. In the 1980's when headlamps having halogen light bulbs were first built, the government enacted photometric tests. These tests dictated that light of a high enough intensity to cause spot blindness in other motorists did not reach certain regions in a space in front of a motor vehicle headlamp. Spot blindness was only a problem for halogen lights since these lights produce a much more intense output when compared with non-halogen lamps.

U.S. Pat. No. 5,517,389 to Meyers concerns an electrochromic lamp assembly including a reflector having two or more reflective surfaces. A light source and an electrochromic means is positioned between the light source and at least one reflective surface. Each reflective surface directs light in a different direction. The electrochromic means is capable of blocking light from exiting the lamp assembly from at least one direction.

SUMMARY OF THE INVENTION

The present invention concerns a lamp assembly or, preferably, for use with a motor vehicle. The lamp assembly includes regions on a light transmitting portion of an assembly enclosure that can be selectively controlled to change from opaque to highly transmissive. The enclosure can be formed as a separate unit such as a housing or formed integral with other portions of the motor vehicle. In the exemplary embodiment, the enclosure is a housing. If used as a headlamp, the lamp assembly can operate as a fog lamp, can provide a low beam output lamp, can provide a high beam output lamp and can provide various combinations of these lamp operations. Other vehicle lamps such as a tail lamp can utilize features of the invention to control both the appearance and function of such lamps.

One exemplary embodiment of a lamp assembly constructed in accordance with the invention includes a light source, preferably a lamp bulb, for emitting light from the lamp assembly that is supported by an enclosure having a light transmissive portion for transmitting light from the lamp bulb to an illumination zone. At least a portion of the enclosure is affixed with a material which covers a selected region of the light transmissive portion of the enclosure. By electrically energizing the material, its light transmissive properties are controlled, thereby controlling an amount of light transmitted from the light source to the illumination zone. A drive circuit is electrically coupled to the material.

When used as a headlamp, the exemplary embodiment of the invention gives a motorist direct control of intensity and zones of illumination. The motorist can adjust the illumination intensity and zone for specific traveling conditions, i.e. weather, terrain, time of day etc. This creates a safer environment to operate the motor vehicle.

Practice of the exemplary embodiment of the invention is achieved with one, high intensity light source supported by a headlamp assembly having a reflective region for directing light through the light transmissive portion of the assembly. This structure can provide high beam, low beam and fog lamp outputs from a headlamp without resort to multiple bulbs and bulb housings.

An exemplary embodiment of the invention includes multiple regions that are defined by the material. These photometric patches eliminate a need for a bulb shield. Current commercially available bulb shields are made specifically for a high beam, low beam or fog lamp bulb housing. Alternatively, the bulb shield must be mechanically repositioned inside a bulb housing. Either of these two techniques is more complex and costly than a headlamp assembly built in accordance with the present invention.

The material can be any material where when electrically energized alters the light emitted from the light source to the illumination zone. Preferably, the material is a PDLC material (polymer dispersed liquid crystal) which scatters light rather than absorbing the light to block its transmission. This characteristic greatly reduces heat build up associated with masking a halogen lamp, whose high intensity light output causes a rapid build up of heat in any material which absorbs that light. The material can be affixed to the enclosure in any suitable manner apparent to these of ordinary skill in the art in view of this disclosure. In the exemplary embodiment, the enclosure is coated with the material.

In one exemplary embodiment of the present invention, when the bulb is extinguished, a current is applied to all regions of the PDLC material thereby causing those regions to be light transmissive for cosmetic purposes. An alternative option is to apply current to the PDLC material only when the bulb is illuminated. This would serve a cosmetic purpose so that a headlamp, tail lamp, fog light etc. could be rendered opaque when not illuminated and rendered light transmissive in a controlled manner across it surface when its associated lamp or bulb is on. As a still additional option, the PDLC regions can be rendered light transmitting when the motor vehicle engine is running regardless of the bulb condition so that a parked vehicle will have an opaque lamp assembly.

These and other objects, advantages and features of the invention will become better understood from a detailed description of an exemplary embodiment of the invention which is described in conjunction with the accompanying drawings.

BRIEF DESCRIPTION OF THE DRAWINGS

FIGS. 2A, 2B and 2C are front plan, side plan, and section views of a headlamp housing that forms part of the FIG. 1 assembly;

FIG. 6 is a third alternate depiction of a headlamp assembly constructed in accordance with the invention;

FIG. 7 is a depiction of a tail lamp assembly constructed in accordance with the present invention;

FIG. 8 is a schematic depiction of a headlamp assembly including a lens cap for increasing a spacing of light transmitting control material from a light emitting bulb.

EXEMPLARY EMBODIMENT FOR PRACTICING THE INVENTION

Figure 1:
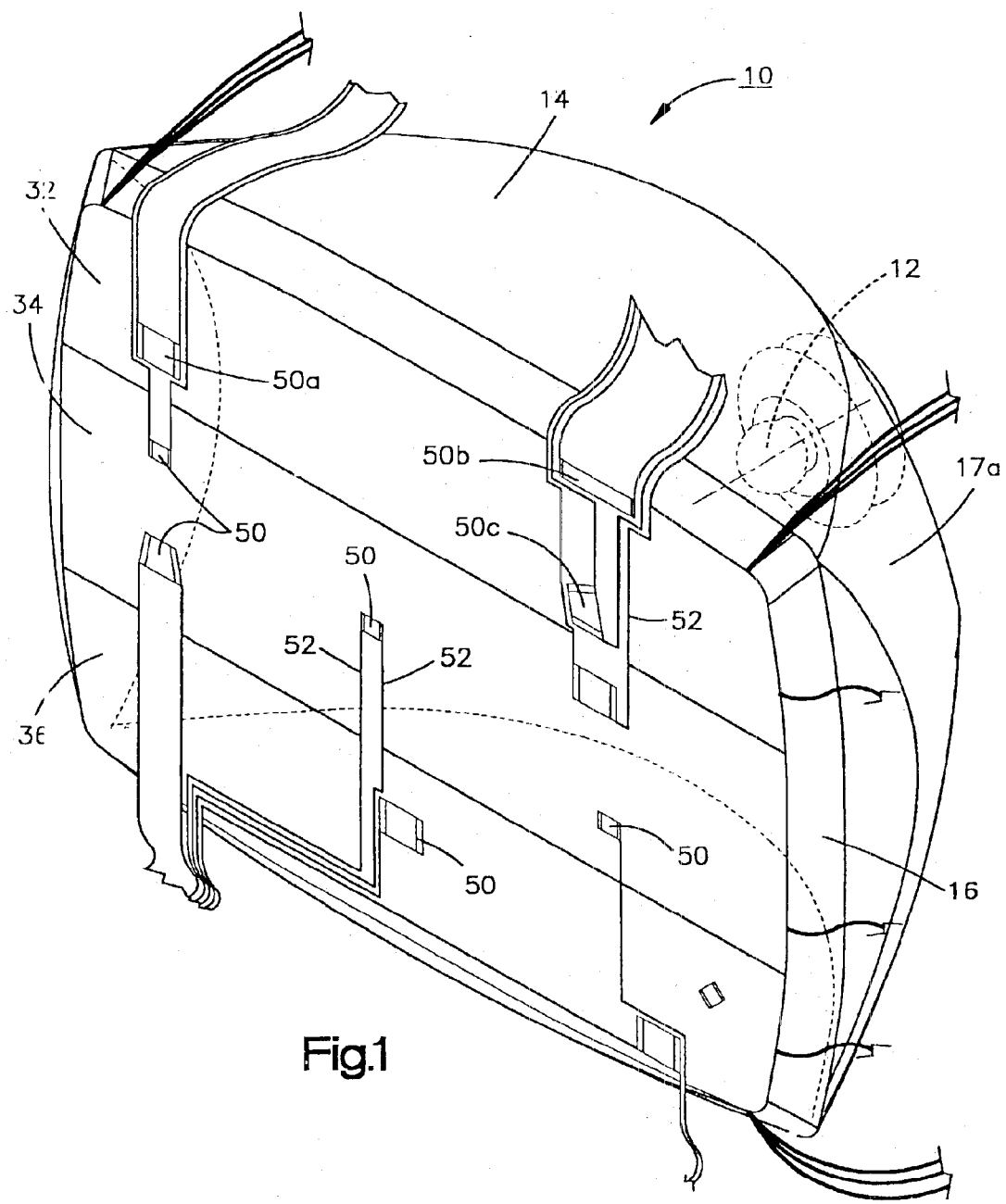
FIG. 1 is a perspective view of a headlamp assembly constructed in accordance with the present invention.

Turning now to the drawings, FIG. 1 illustrates a headlamp assembly 10 that includes a headlamp bulb 12 for emitting light mounted to a bulb housing 14 having a light transmissive portion or lens 16 for emitting light from the headlamp bulb 12 to an illumination zone in front of the headlamp assembly 10. An interior surface 20 of the light bulb housing 14 reflects light reaching the surface 20 back into the housing interior so that it will exit the housing through the light transmissive portion 16. The bulb 12 can take the form of a traditional head lamp bulb or can be constructed from other known light sources. Some of such light sources include, for example, High Intensity Discharge (HID), Halogen, Flouorescent, Incandescent, and High Intesity Light emitting diode/diodes.

The light transmissive portion of the housing is coated at specified regions with a coating material. When these regions are electrically energized the coating material is rendered more light transmissive to alter the amount of light transmitted from the bulb to the illumination zone. A drive circuit 30 (see FIG. 3) electrically coupled to the regions of coating material energizes the coating material and thereby control a light output from the headlamp assembly.

In accordance with the exemplary embodiment of the invention the light transmissive portion of the housing is coated with three bands 32, 34, 36 of the coating material. These bands are independently energized to adjust the light output from the headlamp assembly 10. The headlamp assembly 10 is for a motor vehicle. The opacity of the three bands 32, 34, 36 of coating material are selectively controlled to adjust the opacity of the three bands thereby producing a high beam output, a low beam output and a fog lamp output, respectively, from the headlamp assembly 10. In addition to the three bands 32, 34, 36, the disclosed embodiment of the invention includes a plurality of smaller regions 50 of coating material that are coupled to the drive circuit 30 by means of conductors 52 routed across the light transmissive portion of the housing. Both the bands 32, 34, 36 and additional smaller regions or patches 50 are most preferably built using cut to size sheets of a polymer dispersed liquid crystal material, known as PDLC material. One example of a commercially available PDLC material is Polymer Stabilized Technology (PST) available from Kent State Liquid Crystal Institute at Kent State University, POB 5190, Kent, Ohio 44242. Another commercially available material is SPD film from Research Frontiers Incorporated, having a business address of 240 Crossways Park Drive, Woodbury, N.Y. 11797. In addition, PDLC material is available from Polytronix, Inc., having a business address of 805 Alpha Drive, Richardson, Tex. 75081 and the Liquid Crystal Institute at Kent State University, POB 5190, Kent, Ohio 44242. This sheet of material can be cut to an appropriate shape and applied to the light transmissive portion of the bulb housing.

The coating material may be affixed to the inside of the lens 16 with a translucent adhesive to protect the material from weathering that would occur outside the lens 16. The coating material may also be applied to an outer surface of the lens 16 using a protective laminate. Additionally the coating material may be a prefabricated panel, which is then clipped or locked into place when the headlamp assembly housing is constructed.

The patches 50 are solely for photometric purposes and are not under direct control of the motorist. The patches are rendered opaque at any time that the headlamp bulb 12 is outputting light to create a field of illumination which is in accordance with governmental photometric standards. The patches 50 are made translucent or light transmitting by applying a current to the patches only when the headlamp bulb 12 is not producing light.

In the disclosed exemplary embodiment, the adhesive used to attach the PDLC material to the lens 16 is an electrically conductive adhesive. Use of the conductive adhesive avoids the use of metal on the sides of the patches 50 and allows wiring to connect to the adhesive that is applied along the outer edges of the PDLC material. This use of adhesive enhances the cosmetics of the lens 16 as well as eliminating the cost of edging the PDLC with copper or other conductive material. One suitable conductive adhesive is sold under the designation NOELLE 805-19 System, a two component (A+B) high performance, silver filled, room temperature curing adhesive that is available from Noelle Industries, Adhesives, Coatings and Conductives, 83 Alexander Rd. Unit 3 Billerica Mass. 01821.

Figure 9B:
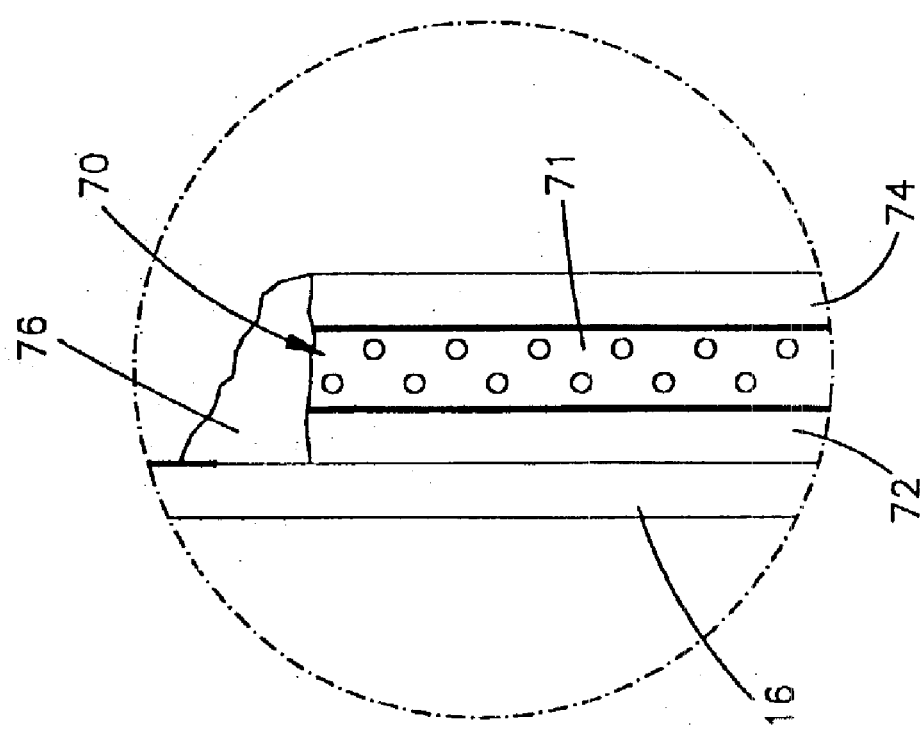
FIGS. 9A and 9B illustrate alternate arrangements for supporting light transmitting control material.
Figure 9A:
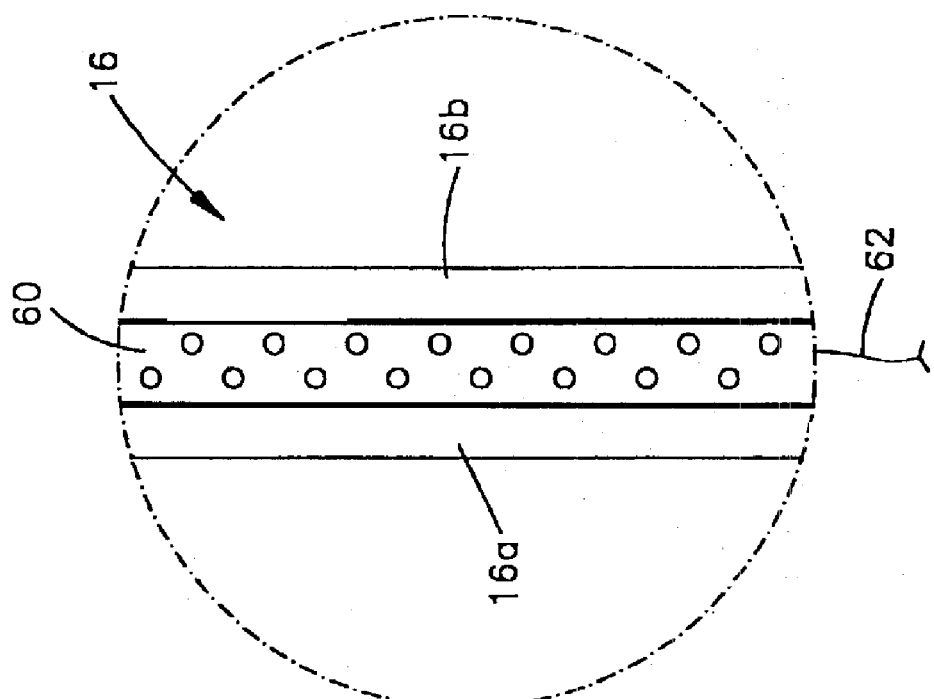

In an alternative mounting scheme, the lens 16 has a multiple layer construction. As seen in FIG. 9A a piece of PDLC material 60 is sandwiched between inner and an outer layers 16a, 16b of light transmitting plastic. In this alternate embodiment energizing leads or wires 62 are routed to Indium Tin Oxide layers on inner and outer surfaces of the PDLC material through a narrow gap between the inner and outer layers 16a, 16b of the lens 16. This multiplayer embodiment defines distinct regions of PDLC material but in a way wherein those regions are defined at the time the lens 16 is fabricated rather than at a subsequent time by applying PDLC regions to the lens by means of an adhesive. In an alternate embodiment shown in FIG. 9B a single lens 16 houses the bulb 12 and individual segments 70 of coating material are constructed by sandwiching a suitably sized and shaped PDLC material 71 between inner and outer layers 72, 74 of plastic. The resulting regions of coating material are then attached to the lens 16 using the conductive adhesive 76. As a modification to this design, the regions of coating material can be attached to the lens 16 by means of mechanical attaching hardware such as for example by means of clips that hold an array of such segments together as well as clips that attach the array to an outer surface of the lens 16.

Drive Circuit 30

Figure 3:
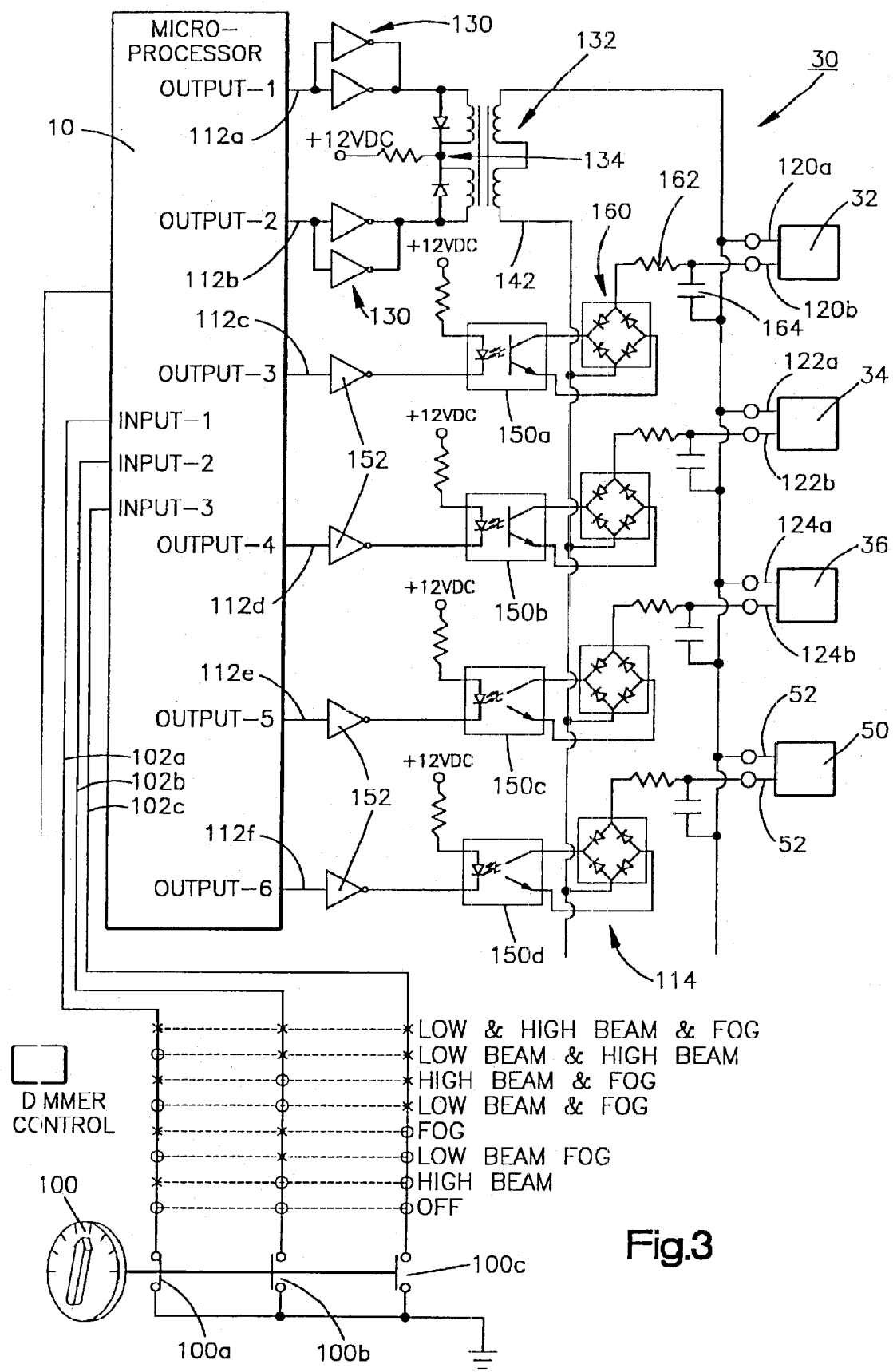
FIG. 3 is a schematic depiction of a drive circuit for activating control components of the headlamp assembly depicted in FIG. 1

Referring now to FIG. 3, the drive circuit 30 includes a user interface that includes a switch selector 100 for controlling inputs 102a, 102b, 102c to a programmable controller 110. The programmable control includes a control program operating system that responds to the signals on the inputs 102a, 102b, 102c to produce on a set of controller outputs 112a–112f. A driver circuit 114 is coupled to the coating material to apply a pulse width modulated signal to the coating material for altering the light transmissive characteristics of said coating material. In accordance with the disclosed exemplary embodiment of the invention, the highest light transmission occurs when the band is activated with a large alternating current square wave signal.

In accordance with the disclosed embodiment of the invention, there are three bands 32, 34, 36 of coating material. Each band is independently controlled by the controller 110. Thus, by referring to FIG. 3, one sees that the band 32 is coupled to two conductors 120a, 120b, the band 34 is coupled to the two conductors 122a, 122b, the band 36 is coupled to the two conductors 124a, 124b. The light transmitting status of the other smaller regions 50 are controller by an output 112f so that the controller activates each of these regions to achieve approximately the same amount of light transmission. In accordance with the preferred embodiment of the invention, the bands 32, 34, 36 each overlap with one or more of the additional small regions or patches 50.

Current is applied to the PDLC patches 50 when the headlamp bulb 12 is not emitting light. This provides an appearance of a clear headlamp lens. At any time the headlamp bulb 12 is producing light all the regions 50 are deprived of current so as to be in an opaque state. This prevents light from the bulb 12 from reaching photometric tests points located in front of the patches.

The programmable controller is programmed so that when one of the bands is driven to a state wherein the material that makes up that band is highly light transmissive, its associated smaller regions of material are in a state of low transmission, i.e. they are highly opaque. Consider the topmost band 32 in FIG. 1. This band 32 is covered in selected regions or zones by three additional smaller regions or patches 50a, 50b, 50c. When the band 32 is activated by the controller 110 to be highly light transmissive, the regions or patches 50a, 50b, 50c are not activated or energized, and consequently, are opaque. Since all patches are coupled to the same output from the controller 110 controls all the patches, when the patches 50a, 50b, 50c are opaque, the patches applied to overlap other bands of the lens are also opaque.

The switch 100 has three contacts 100a, 100b, 100c so that $2^3$ or eight different control signal states can be generated as indicated in Table 1 that follows. As described below, the controller 110 also may be programmed to adjust the light transmitted from the lamp assembly to respond to whether the engine is running or the headlamps are turned on by the motorist. These inputs are referred to as 'control inputs' in the schematic depiction of FIG. 3.

TABLE 1

Control Signal States

| | |
|---|---|
| Lights Off | Current applied to all bands |
| High Beam On | Current applied to band 32, none on 34, 36 |
| Low Beam On | Current applied to band 34, none on 32, 36 |
| Fog Beam On | Current applied to band 36, none on 32, 34 |
| Low Beam with Fog | Current applied to band 34, 36, not 32 |
| High Beam with Fog | Current applied to band 32, 36, not 34 |
| Low Beam with High Beam | Current applied to bands 32, 34, not 36 |
| Low Beam, High Beam and Fog | Current applied to all bands |

It is a requirement of the exemplary embodiment of the present invention that when the bulb 12 is extinguished, a current is applied to all three bands 32, 34, 36. This renders the PDLC material of the bands 32, 34, 36 light transmissive for cosmetic purposes. Automotive companies spend much money on headlamp design every year to create cosmetically attractive bulb shields and practice of the invention helps in achieving an attractive appearance. An alternative option is to apply current to the PDLC bands only when the bulb 12 is illuminated. This would serve a cosmetic purpose so that a headlamp, taillamp, fog light could be rendered opaque when not illuminated and rendered light transmissive in a controlled manner across its surface when its associated lamp is on. As a still additional option, the PDLC regions can be rendered translucent when the motor vehicle is running regardless of the bulb condition.

So long as the controller 110 is powered up by a signal derived from the twelve volt signal from the motor vehicle battery, the controller 110 provides pulsed on/off signals at the two outputs 112a, 112b. These signals have a frequency of about 64 hertz and have a duty cycle of 50%. These pulses pass through high current inverter drivers 130 to a step up transformer 132. The step up transformer 132 has a center tap 134 coupled to the twelve volt output from the vehicle battery. The transformer produces an alternating square wave signal across two bus conductors 140, 142 that alternates back and forth between +40 volts and −40 volts at a frequency of 64 hertz.

As stated above, the programmable controller 110 also produces signals at outputs 112c, 112d, 112e, 112f for controlling a light transmissive characteristic of the bands 32, 34, 36 and collectively the regions 50. These outputs from the controller 110 are 128 hertz, pulse width modulated, square waves. The width of the pulse determines the light intensity from the bulb 12 transmitted by an associated control element of coating material. Each of the outputs 112c, 112d, 112e, 112f is coupled to an associated optoisolator 150a, 150b, 150c, 150d through an inverting, high current drive amplifier 152. Consider the output 112c. When this output goes high, the inverter produces a low signal which turns on a light emitter of the optoisolator 150a. This in turn turns on a transistor of the optoisolator 150a, thereby transmitting the pulse to a bridge rectifier 160. The bridge rectifier acts as a valve to transmit the 64 hertz signal across the bus conductors 140, 142 across an associated control element.

The pulse width of the 128 hertz signal at the outputs 112c, 112d, 112e, 112f determines the light intensity of the light transmitting portions of the housing. The pulse width controls the on time of a bridge rectifier by switching the associate optocoupler on and off. This in turn determines a length of time that the 64 hertz signal from the transformer is applied to an associate PDLC coating member. A resistor 162 (10 k) and a capacitor 164 (1 microfarad) determining the rate at which the voltage can rise across the PDLC. Given more time (wider pulse), the voltage will go higher and increase the light intensity transmitted through an associated control element such as one of the bands 32, 34, 36. Given less time (narrow pulse), the voltage will be lower and decrease the light intensity. The controller can control the pulse width in increments of 30 microseconds (0.000030 seconds) providing good resolution on light intensity control. In one exemplary embodiment, however, the coating material is either rendered essentially transparent due to application of the +/−40 volt signals from the transformer or is rendered opaque by blocking all signals from the transformer. The highly transparent state for the band 32, for example, is achieved by application of a constant high output signal at the output 112c from the controller 110. In accordance with alternate procedures, a dimming of the light transmission is achieved through pulse width modulating an output from the controller 110 with a controlled pulse width signal. Using the programming capability of the controller 110 it is possible to control a level of opacity of each individual PDLC band in order to optimize the headlamp assembly performance. The operating system of the controller 110 can be programmed with preset levels of opacity based upon the type of beam selected. For example, if may be that the optimum "low beam with fog" lamp combination emits a preferred amount of light by making the low beam PDLC band 34 20% opaque. This value can be programmed or adjusted depending on the configuration of the lamp assembly and is generally an empirically determined factor. It may also be possible to use a master dimming switch that controls the opacity of the three PDLC bands 32, 34, 36. Note, in this regard, the opacity of the patches 50 is constant so the dimming capacity noted above does not apply to these regions. An alternate method of energization uses a control over a Direct Current voltage level rather than a pulsing or alternating signal. In this embodiment the Direct Current applied to a PDLC region is varied to adjust the opacity of the PDLC region.

The bulb housing 14 is most preferably made from a front, light transmissive portion 16 that functions as a lens and an interior light reflecting surface 20. A rear wall 16 of the assembly 10 supports the bulb 12 in relation to the front, light transmissive portion so that when the bulb is energized to emit light those portions of the light transmissive portion 170 not blocked by sheets of opaque PDLC material transmit light to an illumination zone or region. Both the light transmissive and reflector sections 16, 20 are molded plastic parts. During assembly, the bulb 12 is mounted to the reflector section 20 and conductors for energizing the PDLC regions are attached to the reflector. The PDLC regions are attached to the light transmissive portion 16 of the housing. In the disclosed embodiment of the invention, the bands 32, 34, 36 are supported on an inner surface of the light transmissive section 16. The PDLC areas 50 are attached to an outer surface of the light transmissive section 16. The reflector section 20 most preferably has associated to it a material that enhances the light reflecting capacity of an inner surface of the section 20.

The programmable controller 110 most preferably is a microprocessor that receives a DC energization signal from a voltage regulator circuit (not shown) powered by a motor vehicle battery. The microprocessor is programmed with an operating system that periodically senses the status of the input switches and provides appropriate pulse width modulated outputs from the outputs 112a–112f. The use of a microprocessor adds flexibility to a manner in which the PDLC coated regions are activated. In certain instances such flexibility is not needed and a programmed logic array could be used to provide the input sensing and output signal control.

In the exemplary embodiment of the invention, there is no benefit to separate programming of the PDLC patches 50 for different activations of the three PDLC bands 32, 34, 36. However, the photometrics of a vehicle's headlamp depend upon the shape, height and overall dimensions of the car as well as the shape of the bulb housing's reflective surface which is dependent on each vehicle's front end design. Therefore, if some photometric points in front of the headlamp are necessary for a high beam but not a low beam, and if these points were affected by the low beam when it is operated without the high beam, the controller 110 can be programmed to only make the photometric point opaque in the high beam state by selective activation of the patches depending on the high beam/low beam status.

Photometric standards pursuant to 49 C.F.R. sec 571.108 (b) are tabulated below and indicate zones of coverage for the PDLC patches 50.

TABLE 2

Photometric Test Point Values for Mechanical Aim Headlighting Systems UPPER BEAM

| Test Points (degrees) | Candela Maximum | Candela Minimum |
| --- | --- | --- |
| 2U-V | — | 1,500 |
| 1U-3L and 3R | — | 5,000 |
| H-V | 75,000 | 40,000 |
| H-3L and 3R | — | 15,000 |
| H-6L and 6R | — | 5,000 |
| H-9L and 9R | — | 3,000 |
| H-12L and 12R | — | 1,500 |
| 1.5D-V | — | 5,000 |
| 1.5D-9L and 9R | — | 2,000 |
| 2.5D-V | — | 2,500 |
| 2.5D-12L and 12R | — | 1,000 |
| 4D-V | 12,000 | — |

TABLE 3

Photometric Test Point Values for Mechanical Aim Headlighting Systems LOWER BEAM

| Test Points (degrees) | Candela Maximum | Candela Minimum |
| --- | --- | --- |
| 10U-90U | 125 | — |
| 4U-8L and 8R | — | 64 |
| 2U-4L | — | 135 |
| 1.5U-1R to 3R | — | 200 |
| 1.5U-1R to R | 1,400 | — |
| 1U-1.5L to L | 700 | — |
| 0.5U-1.5L to L | 1,000 | — |
| 0.5U-1R to 3R | 2,700 | 500 |
| H-4L | — | 135 |
| H-8L | — | 64 |
| 0.5D-10.5L to L | 3,000 | — |
| 0.5D-1.5R | 20,000 | 10,000 |
| 1D-6L | — | 1,000 |
| 1.5D-2R | — | 15,000 |
| 1.5D-9L and 9R | — | 1,000 |
| 2D-15L and 15R | — | 850 |

TABLE 3-continued

Photometric Test Point Values
for Mechanical Aim Headlighting Systems
LOWER BEAM

| Test Points (degrees) | Candela Maximum | Candela Minimum |
|---|---|---|
| 4D-4R | 12,500 | — |

TABLE 4

Photometric Test Point Values
for Visual/Optical Aim Headlighting Systems
UPPER BEAM

| Test Points (degrees) | Candela maximum | Candela Minimum |
|---|---|---|
| 2U-V | — | 1,500 |
| 1U-3L and 3R | — | 5,000 |
| H-V | 75,000 | 40,000 |
| H-3L and 3R | — | 15,000 |
| H-6L and 6R | — | 5,000 |
| H-9L and 9R | — | 3,000 |
| H-12L and 12R | — | 1,500 |
| 1.5D-V | — | 5,000 |
| 1.5D-9L and 9R | — | 2,000 |
| 2.5D-V | — | 2,500 |
| 2.5D-12L and 12R | — | 1,000 |
| 4D-V | 12,000 | — |

TABLE 5

Photometric Test Point Values
for Visual/Optical Aim Headlighting Systems
LOWER BEAM

| Test Points (degrees) | Cendela maximum | Candela Minimum |
|---|---|---|
| 10U-90U | 125 | — |
| 4U-8L and 8R | — | 64 |
| 2U-4L | — | 135 |
| 1.5U-1R to 3R | — | 200 |
| 1.5U-1R to R | 1,400 | — |
| 1U-1.5L to L | 700 | — |
| 0.5U-1.5L to L | 1,000 | — |
| 0.5U-1R to 3R | 2,700 | 500 |
| H-4L | — | 135 |
| H-8L | — | 64 |
| 0.6D-1.3R | — | 10,000 |
| 0.86D-V | — | 4,500 |
| 0.86D-3.5L | 12,000 | 1,800 |
| 1.5D-2R | — | 15,000 |
| 2D-9L and 9R | — | 1,250 |
| 2D-15L and 15R | — | 1,000 |
| 4D-4R | 12,500 | — |
| 4D-20L and 20R | — | 300 |

Figure 4:
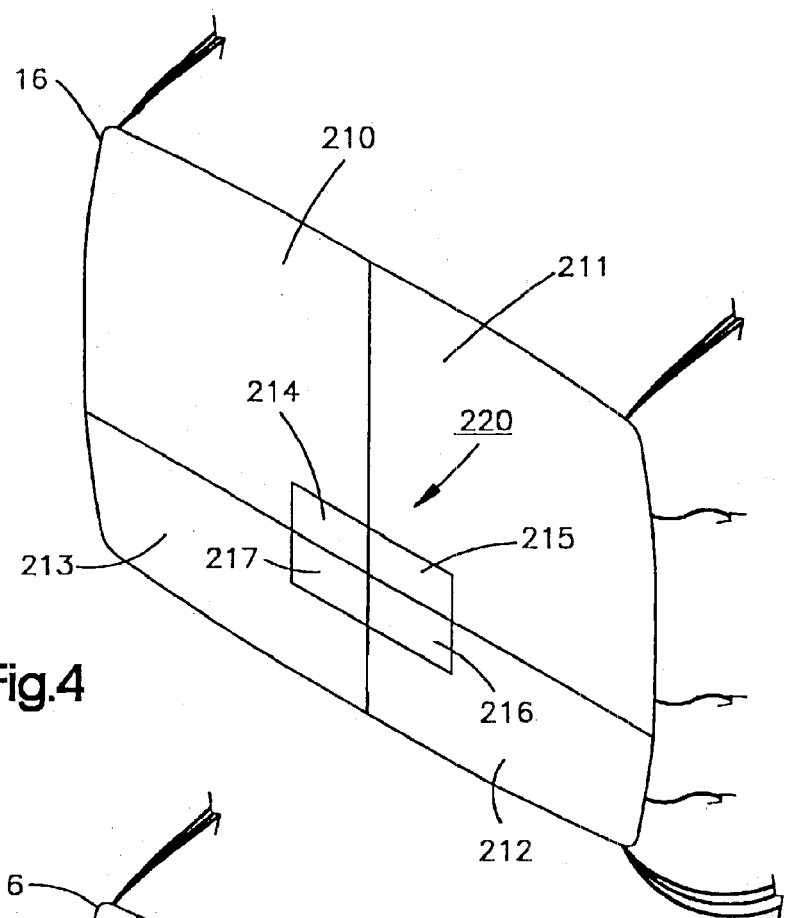
FIG. 4 is a first alternate depiction of a headlamp assembly constructed in accordance with the invention
Figure 5:
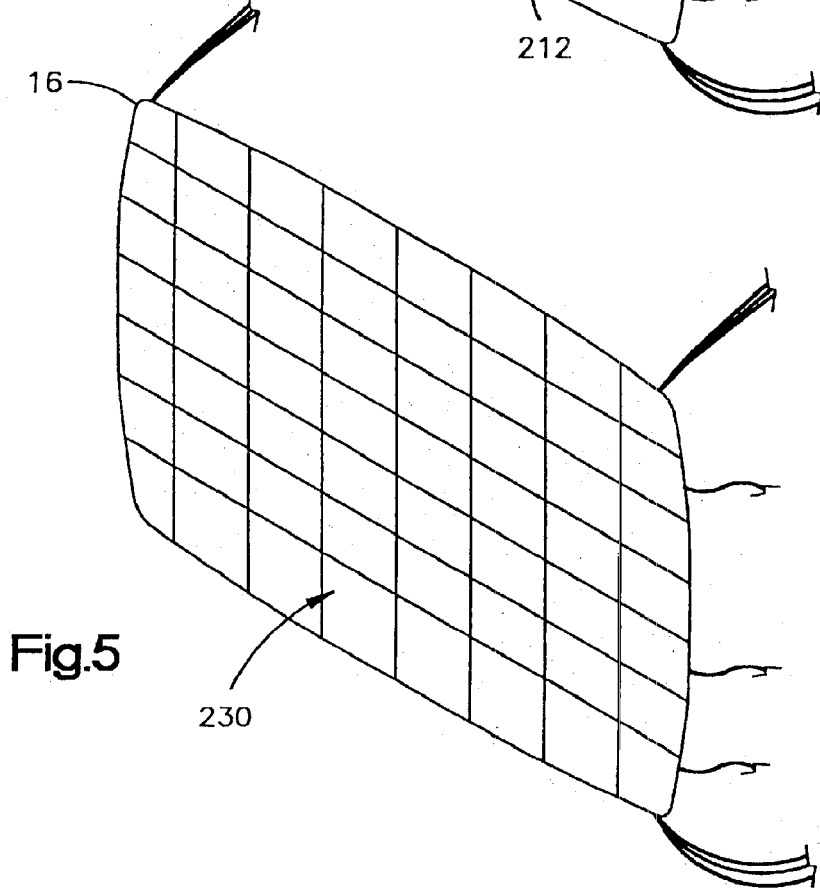
FIG. 5 is a second alternate depiction of a headlamp assembly constructed in accordance with the invention.

FIGS. 4–6 depict alternate PDLC film coating patters for use with headlamps constructed in accordance with the invention. In FIG. 4, the front, forward facing light transmissive portion 16 of the housing is coated with eight separate PDLC regions 210–217 which cover an entire front surface of the housing 14. These regions 210–217 are independently energized to adjust the light output from the headlamp assembly 10. As seen in FIG. 4, four regions 210–213 cover the entire front light transmitting surface or lens with the exception of a 'hole' or center region 220 made up of four center regions 214–217. The hole 220 is located at a region on the lens 16 at which the optics of the reflector 20 (FIG. 2B) concentrates the field of light to a 'hot spot'. By placing the multiple regions 214–217 over the hot spot and individually controlling their opacity, the shape and intensity of the light emitted through the hole 220 onto the road is controlled. Rendering the regions 210–213 outside the hole 220 opaque eliminate any glare from side angles to oncoming motorists.

FIG. 5 depicts the use of a multiple PDLC coating regions to create a grid 230 on the lens 16. This embodiment would give a greater degree of control of light being emitted from any region of the lens 16. As an example, if there is a horizontal cut-off above or below which no light is to be emitted the segments of the grid above or below that cutoff could be controlled to remain opaque and thereby prevent light from being emitted through those regions. In either the FIG. 4 or the FIG. 5 embodiment of the invention, the programmable controller can be programmed to pulse a quadrant of the PDLC material on the bulb housing at a regular frequency so that it is rendered light opaque and then light transmissive with a fifty percent duty cycle. This pulsed operation simulates a turn signal and would eliminate the need for a turning signal separate from the housing.

FIG. 6 depicts a third alternate array 232 of multiple regions attached to a front surface of a lens 16. This embodiment includes multiple bands of PDLC material that extend across the width of the headlamp. One particular band 234 includes multiple smaller segments or regions of PDLC material to give a greater degree of control over the light transmitting characteristics of the lens 16.

In certain bulb housing designs, the distance from the light source or bulb 12 to the lens 16 may be a short enough distance so that the lens temperature reaches or exceeds the operating limits of the PDLC film adhering to the lens. To deal with this potential problem the distance between the bulb 12 and the PDLC regions can be extended by use of a cap 240 (FIG. 8) that fits over the front of the lens 16. An array of one or more selectively light transmitting PDLC regions 242 are applied to an inner surface of a front light transmissive panel 244 of such a cap 240. In this alternate embodiment (FIG. 8) the PDLC film is spaced from an outer surface of the lens by an air gap 246 that adds separation between the bulb 12 and the PDLC materials supported by the cap 240. This added separation maintains the temperature of the PDLC materials within safe operational temperatures. Air circulation in the region of the PDLC materials is achieved by venting through a plurality of slots 248 along a side of the cap 240.

FIG. 7 illustrates an alternative use of the present invention. This figure depicts a tail lamp 250 schematically showing both a brake light 252 and a backup light 254. A taillamp lens 260 faces outward away from a vehicle body. The lens supports an array 262 of one or more PDLC regions attached at selected locations across an inner surface. Wires 264 for selectively controlling the light transmissive characteristics of the array of PDLC regions are routed along an outside surface of the tail lamp 250 to a wiring harness 266 that activates the brake and backup lights. Although the disclosed tail lamp 250 includes brake and backup lights, a similar construction can be used with a tail lamp having only a single tail light and as mentioned previously such a lamp can include a control for simulating a turn signal rather than turning on and off the bulb.

Alternative Embodiments for Practicing the Invention

In an alternative embodiment of the present invention, reverse mode polymer dispersed liquid crystal is used as the coating material. Reverse mode PDLC material operates in a manner opposite to the PDLC material disclosed in the exemplary embodiment. When current is applied to the reverse mode PDLC material the material is rendered more opaque, on the other hand, when no current is applied, the material is rendered more light transmissive.

As noted above, FIG. 1 illustrates a headlamp assembly 10 that includes a headlamp bulb 12 for emitting light that is mounted to a bulb housing 14 having a light transmissive portion or lens 16 for emitting light from the headlamp bulb 12 to an illumination zone in front of the headlamp assembly 10. An interior surface 20 of the light bulb housing 14 reflects light reaching the surface 20 back into the housing interior so that it will exit the housing through the light transmissive portion 16.

The light transmissive portion 16 of FIG. 1 is coated at specified regions with a coating material. In the alternative embodiment, when these regions are electrically energized the coating material is rendered more opaque to block more light from passing through the coating material, whereas when the regions are not electrically energized, the coating material is more light transmissive. A drive circuit 30 (see FIG. 3) is electrically coupled to the regions of coating material and thereby controls a light output from the headlamp assembly.

Similar to the exemplary embodiment, in the alternative embodiment of the invention the light transmissive portion of the housing is coated with three bands 32, 34, 36 of the coating material. These bands are independently energized to adjust the light output from the headlamp assembly 10. The headlamp assembly 10 is for a motor vehicle. The opacity of the three bands 32, 34, 36 of coating material are selectively controlled to adjust the opacity of the three bands thereby producing a high beam output, a low beam output and a fog lamp output, respectively, from the headlamp assembly 10. In addition to the three bands 32, 34, 36, the disclosed alternative embodiment of the invention includes a plurality of smaller regions 50 of coating material that are coupled to the drive circuit 30 by means of conductors 52 routed across the light transmissive portion of the housing. Both the bands 32, 34, 36 and additional smaller regions or patches 50 are most preferably built using cut to size, sheets of a reverse mode polymer dispersed liquid crystal material. The coating material in the alternative embodiment may be affixed in a similar manner as disclosed in the exemplary embodiment.

The patches 50 are solely for photometric purposes and are not under the direct control of the motorist. The patches are rendered opaque at any time that the headlamp bulb 12 is outputting light to create a field of illumination which is in accordance with governmental photometric standards. When the headlamp bulb 12 is not producing light, there is also no current being applied to the patches 50 so that the patches are rendered light transmissive.

FIG. 3 shows the drive circuit 30 which includes a user interface that includes a switch selector 100 for controlling inputs 102a, 102b, 102c to a programmable controller 110. The programmable control includes a control program operating system that responds to the signals on the inputs 102a, 102b, 102c to produce on a set of controller outputs 112a–112f. A driver circuit 114 is coupled to the coating material to apply a pulse width modulated signal to the coating material for altering the light transmissive characteristics of the coating material. In accordance with the disclosed alternative embodiment of the invention, the highest light transmission occurs when the band is not activated.

In accordance with one embodiment of the invention, there are three bands 32, 34, 36 of coating material. The controller 110 independently controls each band. Thus, by referring to FIG. 3, one sees that the band 32 is coupled to two conductors 120a, 120b, the band 34 is coupled to the two conductors 122a, 122b, the band 36 is coupled to the two conductors 124a, 124b. The light transmitting status of the other smaller regions 50 are controlled by an output 112f so that the controller regulates each of these regions to achieve approximately the same amount of light transmission. In accordance with this embodiment of the invention, the bands 32, 34, 36 each overlap with one or more of the additional small regions or patches 50.

No current is applied to the reverse mode PDLC patches 50 when the headlamp bulb 12 is not emitting light. This provides an appearance of a clear headlamp lens. At any time the headlamp bulb 12 is producing light, all the regions 50 are supplied current so as to render the regions more opaque. This prevents too high light levels from the bulb 12 from reaching photometric tests points located in front of the patches.

In accordance with the alternative embodiment, the programmable controller is programmed so that when one of the bands is unactivated, making the material highly light transmissive, its associated smaller patch regions are activated to make them highly opaque. Consider the topmost band 32 in FIG. 1. This band 32 is covered in selected regions or zones by three additional smaller regions or patches 50a, 50b, 50c. When the band 32 is deprived of current by the controller 110 to be highly light transmissive, the regions or patches 50a, 50b, 50c are activated or energized, and consequently, are opaque. Since all patches are coupled to the same output from the controller 110 controls all the patches, when the patches 50a, 50b, 50c are opaque, the patches applied to overlap other bands of the lens are also opaque.

The switch 100 has three contacts 100a, 100b, 100c so that $2^3$ or eight different control signal states can be generated. As described below, the controller 110 also may be programmed to adjust the light transmitted from the lamp assembly to respond to whether the engine is running or the headlamps are turned on by the motorist. These inputs are referred to as 'control inputs' in the schematic depiction of FIG. 3. In the alternative embodiment, the controller is programmed in a manner to comport to the nature of the reverse mode PDLC material. Therefore, when one of the bands 32, 34, 36 or patches 50 is to be rendered highly light transmissive, the controller does not supply current to these areas. On the other hand, when one of the bands or patches is to be opaque, according to the status of the switch, the controller supplies current to this area. The same schematic depiction in FIG. 3, relating to the exemplary embodiment, applies to the disclosed alternative embodiment, however, the microprocessor outputs based on the control signals coming from the switch 100 are determined based on the nature of the reverse mode PDLC material.

The alternative embodiment also contemplates that when the bulb 12 is extinguished, current is not applied to all three bands 32, 34, 36. This renders the reverse mode PDLC material of bands 32, 34, 36 light transmissive for cosmetic purposes. The reverse mode PDLC material allows the bands 32, 34, 36 to be light transmissive when the motor vehicle is not running. Since no current is applied to the reverse mode PDLC material, use of this material eliminates the need for supplying current to the lamps when the motor vehicle is not running.

As noted above, the controller disclosed in the alternative embodiment operates in the same manner as the controller disclosed in the exemplary embodiment. The use of the reverse mode PDLC material in the alternative embodiment requires current to render the bands 32, 34, 36 and patches 50 opaque and no current to render these areas light transmissive. The microprocessor operating system determines whether or not current is applied based on inputs from the switch 100 while all other aspects relating to FIG. 3 remain the same. A reverse mode PDLC material that is clear in the undriven state and is opaque when energized is commercially available from Merck Liquid Crystals under the trade designation Licrilite. (Registered Trademark)

In another embodiment of the present invention, a dye is incorporated into the coating material that covers the light transmissive portion 16 of the light bulb housing 14 in the headlamp assembly 10 of FIG. 1. Preferably, dichroic dye is added to the liquid crystal coating material in order to provide color to the PDLC film covering the light transmissive portion 16 of the headlamp assembly 10. The dichroic dye can be incorporated into either the standard PDLC material or the reverse mode PDLC material. In general, dichroic dyes comprise dye molecules that are generally a rod shaped configuration. These molecules align themselves parallel with the direction of the liquid crystal material and an electric field is applied to control the alignment of the dye molecules. In the presence or absence of an electric field, the dye molecules can take on the appearance of being either colored or transparent. By altering the electric field, the dye molecules can be converted from a transparent state to a colored state and visa versa.

The type of dichroic dye can be selected to correspond to the type of coating material being used, i.e. standard PDLC material or reverse mode PDLC material. In the case where the standard PDLC coating material is used, an absence of electric current renders the standard PDLC material more opaque. When a dye is incorporated into the standard PDLC material, the appearance in the absence of electric current is rendered more colored and opaque. The color will depend on the type and color of the dye selected. When electric current is applied to the standard PDLC material, the material takes on a transparent appearance, thus allowing the transmission of light. Therefore, standard dyed PDLC material will take on a more clear (non-colored) light transmissive appearance or a colored light transmissive appearance.

With respect to reverse mode PDLC material, a dye is selected that is consistent with the physics of the reverse mode PDLC material. When no electric current is applied to the dyed reverse mode PDLC material, the material takes on a more clear (non-colored) light transmissive appearance or a colored light transmissive appearance. When electric current is applied to the dyed reverse mode PDLC material, the reverse mode material takes on a more colored opaque appearance. For both types of PDLC materials, the degree of color and/or opacity is proportional to the amount or absence of electric current being applied to the material. Thus, the light transmissive portion 16 of the headlamp assembly 10 in FIG. 1 can be rendered in different states of color and/or opacity depending on different combinations of dye type, coating type and electric current.

Dyed PDLC material can be used in place of non-dyed PDLC material in any of the preceding embodiments for the purpose of coloring a headlamp, tail lamp, fog lamp, etc. The dye color can be selected to either match or contrast the color of the vehicle for cosmetic purposes. In addition, dyes can be selected to provide for different colors of light to be emitted from the light transmissive portion of the headlamp assembly. Dichroic dyes can be incorporated into the PDLC material in any fashion known to those of skill in the art in view of this disclosure. The dyes normally are sold in powdered form and are commercially available from Mistu Toatsu Senyro Company.

While the exemplary and alternative embodiments of the invention have been described with a degree of particularity, it is the intent that the invention includes all modifications and alterations from the disclosed design falling within the spirit or scope of the appended claims.

What is claimed is:

1. A lamp assembly comprising:
   a light source for emitting light from the lamp assembly;
   a light source enclosure having a light transmissive portion for transmitting light from the light source to an illumination zone, a portion of said enclosure including a material which covers the light transmissive portion of the enclosure with a matrix array of rows and columns and which when electrically energized alters an amount of light transmitted from the light source to the illumination zone; and
   a drive circuit electrically coupled to the material for selectively energizing the material and thereby controlling a light output from the lamp assembly.

2. The apparatus of claim 1 wherein the material comprises a sheet of pliable PDLC that is supported by the light transmissive portion of the enclosure.

3. The apparatus of claim 1 wherein the light transmissive portion of the enclosure has affixed to it multiple regions of the material that are independently energized to adjust the light output from the lamp assembly.

4. The apparatus of claim 1 wherein the enclosure is a housing that can be coupled to a motor vehicle.

5. A lamp assembly comprising:
   a light source for emitting light from the lamp assembly;
   a light source enclosure having a light transmissive portion including inner and outer layers for transmitting light from the light source to an illumination zone, a portion of said enclosure including a material which covers a selected region of the light transmissive portion of the enclosure and which when electrically energized alters an amount of light transmitted from the light source to the illumination zone wherein said material is supported between the inner and outer layers of the light transmitting portion; and
   a drive circuit electrically coupled to the material for selectively energizing the material and thereby controlling a light output from the lamp assembly.

6. The apparatus of claim 5 wherein the material comprises distinct regions that are individually energized by conductors that are routed between the inner and the outer layers of the light transmitting portion of the enclosure.

7. The apparatus of claim 6 wherein the material is a PDLC material.

8. A lamp assembly comprising:
   a light source for emitting light from the lamp assembly;
   a enclosure having a light transmissive portion for transmitting light from the light source to an illumination zone,
   a cap attached to the enclosure that includes a light transmitting cap portion between the light source and the illumination zone which supports a material which when electrically energized alters an amount of light transmitted from the light source to the illumination zone; said cap spacing the material a distance from the light source to control heat transfer from the light source to the material; and
   a drive circuit electrically coupled to the material for selectively energizing the material and thereby controlling a light output from the lamp assembly.

9. A process for constructing a lamp assembly comprising:
- positioning a light source within an enclosure having a light transmissive portion for transmitting light from the light source to an illumination zone,
- mounting a material in relation to the enclosure to cover selected regions of the light transmissive portion; and
- coupling the material to a drive circuit for selectively energizing the material which when electrically energized renders a region of the light transmissive portion having the material more light transmissive to control light intensity transmitted from the light source to the illumination zone wherein the drive circuit includes a user interface for setting multiple inputs that individually control the light transmissive state of the selected regions.

10. The process of claim 9 wherein the material forms multiple regions in a matrix of rows and columns across a surface of said light transmissive portion of the lamp assembly which are coupled to the drive circuit independently to allow independent control over the light transmitting characteristics of said regions during operation of the headlamp assembly.

11. The method of claim 9 additionally comprising providing an interface for monitoring multiple inputs to control the light transmissive state of the material.

12. A process for operating a lamp comprising:
- positioning a light source within an enclosure having a light transmissive portion for transmitting light from the light source to an illumination zone,
- affixing a material in relation to the enclosure to cover selected regions of the light transmissive portion;
- coupling the material to a drive circuit for controlling a light transmissive state of the material; and
- selectively activating the drive circuit to energize the material and thereby render a region of the light transmissive portion having the material more light transmissive wherein said drive circuit including a user interface for setting multiple inputs that individually control the light transmissive state of the selected regions.

13. A lamp assembly comprising:
- a light source for emitting light from the lamp assembly;
- a light source enclosure having a light transmissive portion for transmitting light from the light source to an illumination zone and a separate enclosure cap supporting a material which when electrically energized alters an amount of light transmitted from the light source to the illumination zone wherein the enclosure cap positions the material a spaced distance from the light transmitting portion of the enclosure to reduce heat transfer to the material from the light source within the enclosure; and
- a drive circuit electrically coupled to the material for selectively energizing the material and thereby controlling a light output from the lamp assembly.

14. A lamp assembly comprising:
- a light source for emitting light from the lamp assembly;
- a light source enclosure having a light transmissive portion for transmitting light from the light source to an illumination zone, a portion of said enclosure including a material which covers multiple regions of the light transmissive portion of the enclosure and which when independently electrically energized alters an amount of light transmitted from the light source to the illumination zone wherein the material is affixed to the light transmitting portion of the enclosure with a conductive adhesive that forms a portion of the conductive path between a drive circuit and the material; and
- a drive circuit electrically coupled to the material for independently energizing each region of material and thereby controlling a light output from the lamp assembly.

15. A lamp assembly comprising:
- a light source for emitting light from the lamp assembly;
- a light source enclosure having a light transmissive portion for transmitting light from the light source to an illumination zone, a portion of said enclosure including a material which covers multiple regions of the light transmissive portion of the enclosure and which when independently electrically energized alters an amount of light transmitted from the light source to the illumination zone; and
- a drive circuit electrically coupled to the material for selectively energizing the material and thereby controlling a light output from the lamp assembly wherein the driver circuit includes a user interface for setting one or more inputs that control the light transmissive state of the multiple regions.

16. A lamp assembly comprising:
- a light source for emitting light from the lamp assembly;
- a light source enclosure having a light transmissive portion for transmitting light from the light source to an illumination zone, a portion of said enclosure including a material which covers multiple regions of the light transmissive portion of the enclosure and which when independently electrically energized alters an amount of light transmitted from the light source to the illumination zone; and
- a drive circuit electrically coupled to the material for selectively energizing the material and thereby controlling a light output from the lamp assembly wherein the driver circuit includes a programmable controller coupled to an output circuit that causes the multiple regions to exhibit one of two light transmissive states, a relatively high light transmissive state and a relatively low light transmissive state.

17. A lamp assembly comprising:
- a light source for emitting light from the lamp assembly;
- a light source enclosure having a light transmissive portion for transmitting light from the light source to an illumination zone, a portion of said enclosure including a material which covers a selected region of the light transmissive portion of the enclosure and which when electrically energized alters an amount of light transmitted from the light source to the illumination zone wherein the enclosure includes a light reflector and wherein the light transmissive portion of the enclosure includes an outer peripheral region and a center region and wherein light reflected from a light reflector is concentrated to exit the enclosure through the center region, said assembly including one or more regions that cover the outer peripheral region of the light transmission portion of the enclosure; and
- a drive circuit electrically coupled to the material for selectively energizing the material and thereby controlling a light output from the lamp assembly.

18. A lamp assembly comprising:
- a light source for emitting light from the lamp assembly;
- a light source enclosure having a light transmissive portion for transmitting light from the light source to an illumination zone, a portion of said enclosure including a material which covers a selected region of the light transmissive portion of the enclosure and which when electrically energized alters an amount of light transmitted from the light source to the illumination zone; and a drive circuit electrically coupled to the material for selectively energizing the material and thereby controlling a light output from the lamp assembly said driver circuit comprising:

i. a user interface including a switch selector;

ii. a programmable controller for responding to the setting of the switch selector to produce a set of driver outputs; and iii. a connector for coupling the driver circuit to the material for applying an alternating signal to the material to alter the light transmissive characteristics of the material.

19. A lamp assembly comprising:

a light source for emitting light from the lamp assembly;

a light source enclosure having a light transmissive portion for transmitting light from the light source to an illumination zone, a portion of said enclosure including a material which covers a selected region of the light transmissive portion of the enclosure and which when electrically energized alters an amount of light transmitted from the light source to the illumination zone; and a drive circuit electrically coupled to the material for selectively energizing the material and thereby controlling a light output from the lamp assembly wherein the drive circuit includes a control output for adjusting a level of light transmission through a region of said material depending upon the activation state of the light source.

20. A lamp assembly comprising:

a light source for emitting light from the lamp assembly;

a light source enclosure having a light transmissive portion for transmitting light from the light source to an illumination zone, a portion of said enclosure including a material which covers a selected region of the light transmissive portion of the enclosure and which when electrically energized alters an amount of light transmitted from the light source to the illumination zone; and a drive circuit electrically coupled to the material for selectively energizing the material and thereby controlling a light output from the lamp assembly wherein the drive circuit applies a direct current (DC) signal output for adjusting the light transmission level of an associated region of material.

* * * * *